United States Patent [19]
Bent et al.

[11] 3,975,032
[45] Aug. 17, 1976

[54] SURGICAL WIRE DRIVING ASSEMBLY

[75] Inventors: John H. Bent, Fullerton; Anthony Russo, La Habra, both of Calif.

[73] Assignee: Minnesota Mining and Manufacturing Company, St. Paul, Minn.

[22] Filed: Mar. 12, 1975

[21] Appl. No.: 557,599

Related U.S. Application Data

[63] Continuation-in-part of Ser. No. 460,813, April 15, 1974, abandoned.

[52] U.S. Cl. ............................. 279/30; 128/92 B; 128/92 E; 279/75
[51] Int. Cl.² ........................................... B23B 5/34
[58] Field of Search ............... 279/30, 75; 226/151, 226/165, 167; 128/92 R, 92 A, 92 B, 92 E, 92 EB, 83 R, 303 R, 305 R

[56] References Cited
UNITED STATES PATENTS

| | | | |
|---|---|---|---|
| 1,714,684 | 5/1929 | Malcolm | 279/30 |
| 2,959,422 | 11/1960 | Manos | 279/30 |
| 3,701,538 | 10/1972 | Hartsell | 279/30 |

FOREIGN PATENTS OR APPLICATIONS

| | | | |
|---|---|---|---|
| 961,920 | 5/1950 | France | 279/30 |
| 331,409 | 11/1935 | Italy | 279/75 |

*Primary Examiner*—Othell M. Simpson
*Assistant Examiner*—W. R. Briggs
*Attorney, Agent, or Firm*—Alexander, Sell, Steldt & DeLaHunt

[57] ABSTRACT

A wire driving assembly for use as a surgical instrument engages a wire in rotating driving relation through a retainer which includes a passageway therethrough for passage of the wire. Cooperating with the retainer is a body member, the latter including a bore in which the retainer is received. Driving connection between the retainer and the wire is achieved by a tapered interior bore of the body member and cooperating engaging elements received in sets of apertures located along the length of the retainer and radially thereof. Each set of apertures is of a different diameter, the diameter of the set at the forward end of the retainer being the largest. Spherical elements are positioned in the apertures and move radially inwardly to a wire engaging position and radially outwardly to a wire releasing position. In one form, a biasing spring urges the retainer towards the wire driving position and release of the wire is effected either by movement of a release element or rearward movement of the driving assembly relative to the wire. In another form, a biasing spring urges the body member forward of the retainer and release is effected by a manual release element. In still another form, a biasing spring urges the body member to the release position and a manual lever is used to establish a wire engaging position by urging the body member in a forward direction.

19 Claims, 10 Drawing Figures

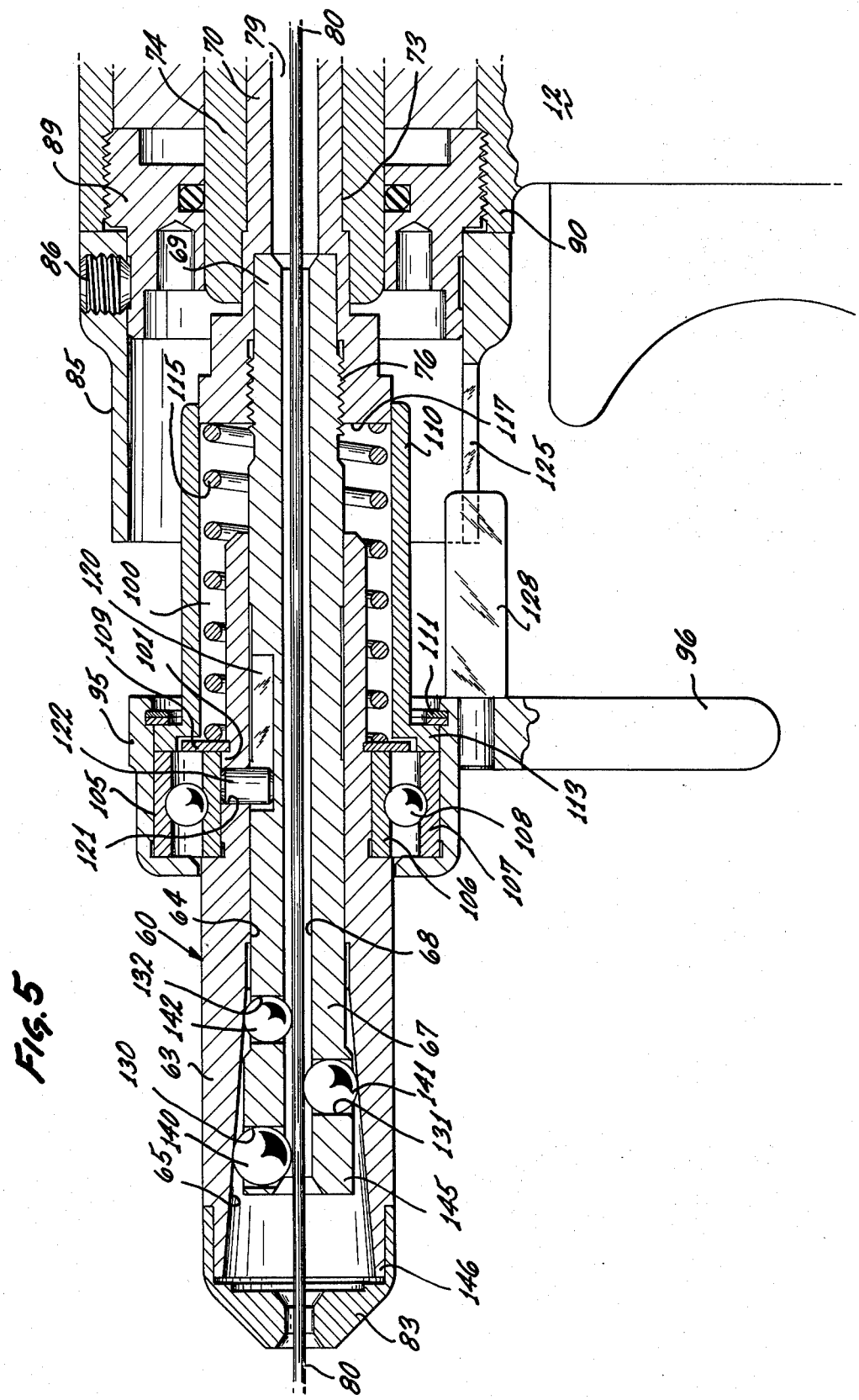

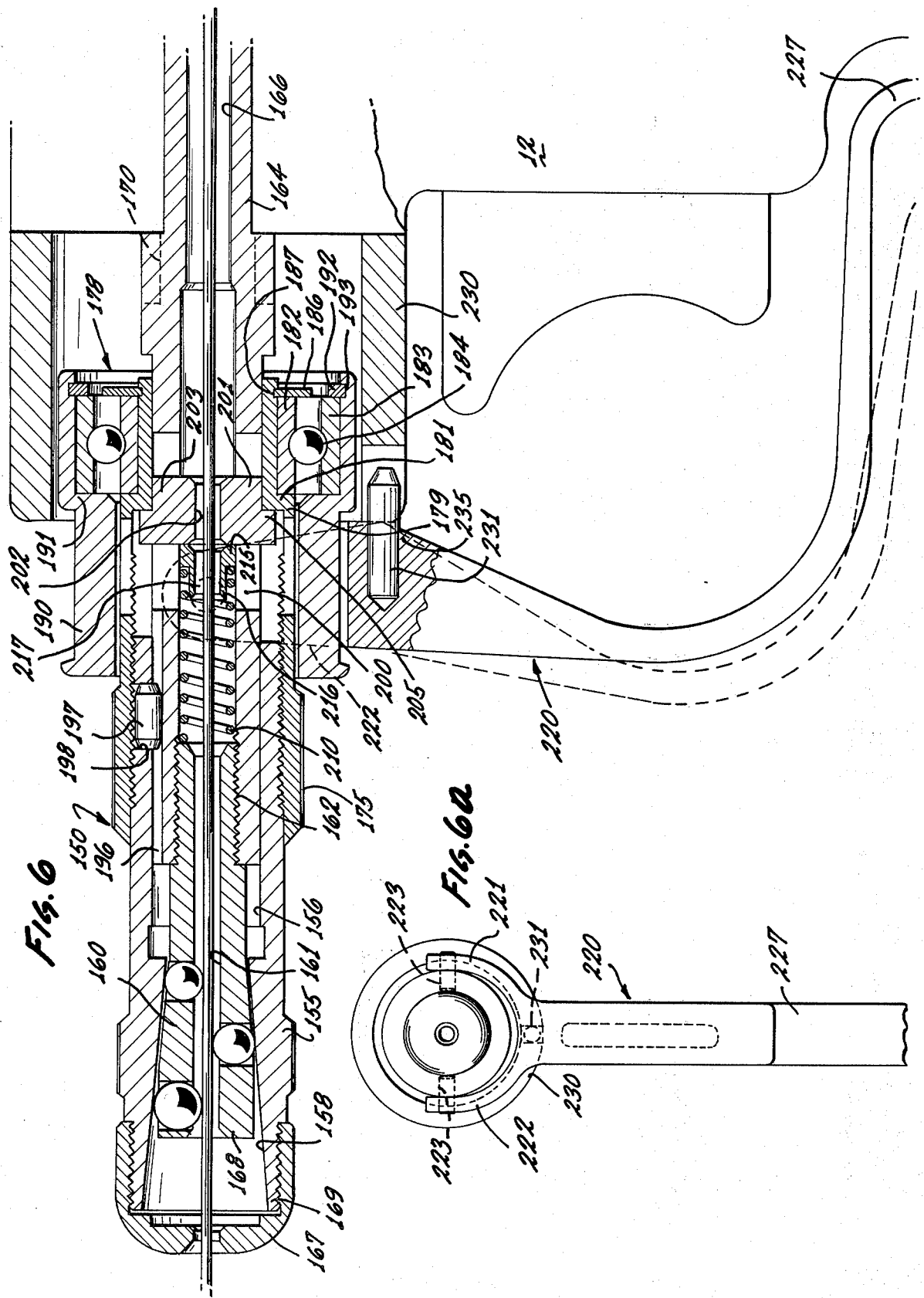

3,975,032

SURGICAL WIRE DRIVING ASSEMBLY

RELATED APPLICATIONS

This application is a continuation-in-part of U.S. application Ser. No. 460,813, filed Apr. 15, 1974, now abandoned and assigned to the same assignee.

BACKGROUND OF THE INVENTION

The present invention relates to a surgical instrument and more particularly to an improved surgical wire driving assembly, in which a wire member may be positively driven, fed out of the assembly in variable controlled lengths, and manually released or engaged in a simple, reliable and efficient manner without the need for extra tools such as keys and the like.

It has been known in the prior art to use a collet-type device which is tightened around a wire-type member to drive the member in a rotary manner. In order to feed the wire member with such device, it is necessary to loosen the collet, feed the wire and re-tighten the collet to establish a driving relation between the collet assembly and the wire member.

In surgical procedures in which osteologist is repairing fractured or broken bones, it is now a common procedure to secure the fractured or broken bones by what is known as a "pin". In reality, the pin is a relatively stiff wire usually of stainless steel.

As will be apparent, it is necessary in such a procedure that the surgeon have positive control of the wire such that it can be driven with precision and accurate control into a desired point in the bone structure. For example, the length of wire between the bone and the face of the driving tool is normally controlled such that it does not become too long since that tends to cause the wire to wobble. The principal force for causing the wire to enter the bone is the pressure applied by the surgeon during the driving operation. Thus, in a typical procedure, the surgeon advances the wire to a certain depth into the bone, retracts the driving tool to provide an additional controlled length of wire, then continues the procedure, severing the wire after an appropriate length of wire has been inserted into the bone.

In some instances, it is necessary for the surgeon to work in areas which are not readily accessible, such as the space between the fingers of an infant. In such an instance, cumbersome and bulky surgical instruments or extra devices needed to release the driver only tend to complicate what might already be a complicated surgical procedure. Moreover, the patient is usually under anesthesia during the procedure and thus any manipulations of a relatively complex nature related to adjustment or operation of the surgical instrument only increases the time for the procedure. This is generally objectionable. For example, if time is taken from the actual procedure to adjust or re-adjust the instrument, there is objection. The operation of the instrument must be efficient, reliable and uncomplicated simply to reduce the total time of the procedure. Thus, there is objection to the use of keys or any other separate free element for tightening or releasing a collet due to the manipulative steps involved.

Release of the wire must be accomplished effectively without forward movement of the front end of the instrument. Usually, the wire extends beyond the front end of the driver assembly and sometimes it is necessary for the surgeon to position the front of the driver against the patient's skin or bone. Release of the wire must be accomplished effectively without the need to use separate unlocking devices such as keys and without moving the front of the driver forward since, in such a case, there is little if any space between the front of the driver and the patient's skin or bone.

DESCRIPTION OF THE PRIOR ART

Devices for feeding wires axially, or quick change tool chucks are known in the prior art, see for example U.S. Pat. No. 523,603 of July 24, 1894; U.S. Pat. No. 1,168,540 of Jan. 18, 1916; U.S. Pat. No. 2,807,473 of Sept. 24, 1957; U.s. Pat. No. 3,398,965 of Aug. 27, 1968; U.S. Pat. No. 3,583,715 of June 8, 1971 and U.S. Pat. No. 3,767,218 of Oct. 23, 1973.

British Pat. No. 651,556 of Apr. 4, 1951 describes a gripping device for exerting a pull on steel wires or rods. As described therein, the device includes a plurality of axially aligned ball elements which engage the wire or rod such that tension may be applied thereto. In order to release the gripping engagement, it is necessary to push the gripper along the wire in a direction opposite to that in which the tension was applied. The device described in the British patent does not impart rotary motion to the member being gripped, but more importantly, does not include a manual release element which operates independently of axial movement of the gripping device.

Thus, a device of the type described in the British patent is objectionable for use as a surgical tool since it is not a driving device, but merely a gripping device, and if there is insufficient length of wire exposed in order to move the gripping device to the release position, it is not possible to continuously feed the wire through the gripper or to release the gripped rod or wire. By way of example, in surgical procedures, where control of the position of the rotatably driven wire must be accurately maintained, the clearance between the front face of the driving tool and the patient's bone structure tends to be quite small, and if it is necessary to advance the tool towards the patient's bone in order to release the wire, this reduces the degree of control which the surgeon has over the rotating wire.

Another patent typical of the prior art devices is French Pat. No. 961,920 made available to the public on May 25, 1950. In that device, ball elements are used to support a stemless drill in a chuck to prevent axial movement of the drill relative to the chuck. Rotation of the drill with the chuck is accomplished by a driving ring which engages the grooves of the drill.

SUMMARY OF THE INVENTION

The present invention provides an improved surgical wire driving device uniquely designed for use in surgical procedures in that positive driving control of the wire is provided, with feeding of variable lengths of wire, and manual release or engagement of the wire, as desired by the surgeon.

In its broadest form, the instrument holds a wire in fixed axial position while rotatingly driving the same, the assembly being urged forward by the surgeon to drive the rotating wire into position. The assembly includes a spindle mounted in a driver and rotated thereby. Cooperating with the spindle is a retainer member received within a body member, the latter including a tapered bore. The retainer and spindle each include a passageway therethrough which receives a wire member, the retainer supporting radially movable elements with engage the wire in axial spaced relation along the length of the wire. In one relative position of the retainer and body, the driving position, the tapered bore operates to force the elements radially inwardly, and in another relative position, the release position, the elements move radially outwardly to release the wire. Movement from the release to the driving position and to the release position is effected by moving one of the body and retainer relative to the other thereby orienting the tapered surface to urge the movable elements radially inwardly or permitting movement thereof radially outwardly.

The instrument preferably biased to one of the driving or releasing positions by a spring member, in the preferred form, and includes a manually operable member to achieve driving or release position. Regardless of whether biased to the driving or release position, the manually operable member is mounted on the instrument and is engageable directly by the surgeon to perform the desired function. The need to utilize a separate tool is thereby eliminated and this operates to reduce significantly the time to effect release or adjustment of the length of wire and the like. Thus, the manually operable member, directly mounted on the instrument, functions as a quick release mechanism in the sense that if in a driving relation, simple manipulation thereof effects release of the wire.

Another feature of the instrument constructed in accordance with the present invention is the fact that release of the wire may be accomplished by moving the front face of the instrument rearwardly, that is, by effecting rearward movement of the body member, or alternatively, by maintaining the front face of the instrument stationary while advancing the retainer in a forward direction. This type of release motion has the advantage of permitting the surgeon to drive the wire into the bone in such a relative position of the instrument that the front face of the instrument directly contacts the bone or skin of the patient. In such a relative position, release must be effected without creating movement of the wire which is positioned as desired by the surgeon. Thus, if it is necessary to move the instrument in a forward direction in order to release the wire, this cannot be carried out since the front face of the instrument is already in contact with the bone or the skin of the patient. Under such an arrangement, it would be necessary for the surgeon to retract a sufficient amount of wire in order to permit the instrument to be moved forward in order to release the wire. As will be appreciated, this is objectionable since it may require the surgeon to move the wire from the desired position.

Overall, the surgical instrument described not only provides for positive control of a wire member while rotating the same accurately, but provides the surgeon with quick and reliable control of the wire at all times during the procedure. For example, by providing wire engaging elements that are spaced axially to engage the wire at spaced portions along its length, any tendency of the wire to wobble during rotation is substantially eliminated. Moreover, such an engagement at spaced portions axially along the length of the wire insures that positive driving relationship is established.

Overall, the cooperation of the retainer and the body member is such that as the surgeon urges the instrument in a forward direction to drive a wire into the bone, the resultant force tends to urge the retainer rearwardly relative to the body member, a movement which tends to cause the wire engaging elements to engage the wire more tightly.

In one form of the present invention, the spindle is attached to rotate the body member, the retainer being movable axially within the body member and urged rearwardly by the biasing spring. In this form, a manual release member is positioned around the outer periphery of the body member and is movable in a forward direction to move the retainer axially forward to the release position.

The above described wire driving assembly is uniquely adapted for use as a surgical instrument in osteological procedures because of its compact size and principally because of the positive control which is provided in the rotating driving engagement with the wire. More specifically, in a typical surgical use, the wire driver is advanced manually towards the patient's bone while being rotated by a power source such as an air driven power gun. Forward of the front cap, which forms the front face of the driving instrument, a short length of wire is exposed and it is this short length of wire which is advanced into the bone by the surgeon manually forcing the rotating wire into the bone structure. As the wire is seated in the bone and secured thereto, it is necessary to feed an additional length of wire. This is accomplished by retracting the driver assembly a predetermined amount, in accordance with the desires of the surgeon, resulting in the automatic feeding of an additional length of wire. Once the surgeon applies pressure to force the additional length of wire into the bone, the driver automatically engages the wire in rotating driving relation, and the advancing procedure is continued until a sufficient length of wire has been properly placed in the bone structure under the surgeon's positive control.

While the wire element normally used in surgical procedures is relatively stiff, it will be apparent that if too long a length of wire is fed, it is possible for the wire to wobble during its rotation, an undesirable condition especially in osteological procedures. If this situation should arise, the surgeon may manipulate the manual release and feed back into the wire driver an appropriate amount of wire such that the whipping does not occur. At the conclusion of the procedure, the wire may be completely released by the manual release mechanism even if the front face of the instrument is directly in contact with the patient's skin or bone. The manual release is achieved by moving the release sleeve towards the front face, and the driving instrument and driving assembly may be withdrawn.

In another form of the present invention, the wire is always engaged in wire driving relation by a retainer having a passageway for a wire member, the retainer being fixed relative to a movable body member. The body member is rotated with the retainer and movable axially relative to the retainer to establish, in a forward position, a driving relation and, in a rearward position, a release relation. The driving relation is established by a relatively strong spring member which urges the body member forward relative to the retainer whereby the interior tapered surface of the body bore urges the spherical elements radially inwardly. Thus, even if the surgeon retracts the instrument, the retainer remains in wire driving relation with the wire. To effect release of the wire, a lever release is provided to effect axial rearward movement of the body member relative to the retainer. Thus, even if the front face of the instrument is in contact with the patient's skin or bone, movement of the body rearwardly, by the lever, is operative to effect release of the wire.

The alternate form of driver assembly of the present invention offers the advantage of permitting the surgeon to retract the wire during a procedure. For example, in some osteological procedures it is necessary for the wire to be driven completely through the bone rather than merely imbedded in the bone. In such an instance, some surgeons follow the practice of driving the wire through the bone so that the forward end of the wire, projecting beyond the bone structure, can be seen or felt. Thereafter, the wire is retracted until its forward end is flush with the bone, or otherwise properly positioned, as determined by the surgeon. Thus, the alternate form of the invention provides for retracting the wire since the spring biasing the assembly into the engaging and driving relation is strong enough to maintain that relation until manually released by the lever, which acts to compress the spring by moving the body member rearwardly as the retainer remains fixed relative to the wire. As the body member moves, the spherical elements contacting the wire are free to move radially outwardly to release the wire.

So too, when the surgeon desires to feed additional wire, the lever is operated to release the wire, the assembly retracted, to feed wire, and the lever is released, the spring being operative to establish a driving relation.

In still another form of the present invention which embodies the desirable features already described, the spindle is connected to rotate the retainer, as in the form previously described, and the body member is movable axially relative to the fixed retainer. A spring member is utilized to bias the body member to the release position, that is, rearwardly relative to the retainer.

Cooperating with the body member is a manually operable member which functions not only to achieve the release position, but which also operates to establish the driving relationship. In this particular form the manually operable member is in the form of a lever engageable by the surgeon as he grips the power tool, the lever being oriented in such a position that as the surgeon places his forefinger over the trigger of the power tool to affect operation thereof, the remaining fingers of the hand can engage the lever. By urging the lever rearwardly, or towards the power tool, in a natural gripping action, driving relationship with the wire is established by urging the body member forward such that its tapered interior surface causes radially inward movement of the wire engaging elements. As long as the lever is maintained rearwardly, driving relationship is maintained. To establish a release position, the surgeon releases the lever which is spring biased to the release position and which operates to affect rearward movement of the body member relative to the retainer.

This particular embodiment of the present invention offers the advantage of allowing the surgeon a positive element of control in which wire driving and releasing is accomplished by one hand, that is, the hand which holds the driving tool on which the instrument is mounted. For example, with this form of tool, the forefinger is normally over the trigger of the power tool while the middle finger, ring finger and pinky operate to control the lever in a very natural type of gripping action. Normally, the sequence involved in the use of a wire driving instrument involves the surgeon's grip on the power tool, aligning the tool in the proper position and depressing the trigger to bring about rotation of the wire driving instrument. Thus, with this particular form, the very action of the surgeon's hand which brings about gripping of the power tool is also operative to permit engagement of the lever to establish the driving relation. Thereafter, all the surgeon need do to affect rotation of the wire is to activate the trigger on the power source.

In the event that it is necessary to feed an additional length of wire, the surgeon releases the lever by moving the middle finger, ring finger, and pinky away from the power tool thereby releasing the lever. The driving tool and the wire driving instrument are then retracted as a unit to affect feeding of an appropriate length of wire, the forward end of the wire being secured by the bone. Subsequently, the surgeon may then again actuate the lever in the natural gripping action to establish the driving relationship and actuate the trigger to continue the procedure.

In the event that it is necessary to retract a wire, the procedure is the same as driving a wire in that the surgeon establishes the driving relationship by manipulation of the lever, as described, and retracts both the wire instrument and the driving tool to affect rearward movement of the wire relative to the bone.

The advantage of this particular form over those previously described is the fact that considerable force can be exerted not only in the forward driving position but in the rearward retracting position. Again, in each instance, the natural position of the hand is such that the surgeon's firm grip on the driving tool effects the driving relationship needed to maintain the wire fixed axially in the tool regardless of whether it is being driven in a forward direction or retracted.

The invention can best be understood by reference to the following description taken in connection with the accompanying illustrative drawings.

BRIEF DESCRIPTION OF THE DRAWINGS

FIG. 5 is a view partly in section and partly in elevation of an alternate form of wire driver in accordance with the present invention;

FIG. 6 is a view partly in section and partly in elevation of still another form of surgical wire driving assembly embodying the present invention; and FIG. 6a is a front view of the unit shown in FIG. 6.

DESCRIPTION OF THE PREFERRED EMBODIMENT

Figure 1:
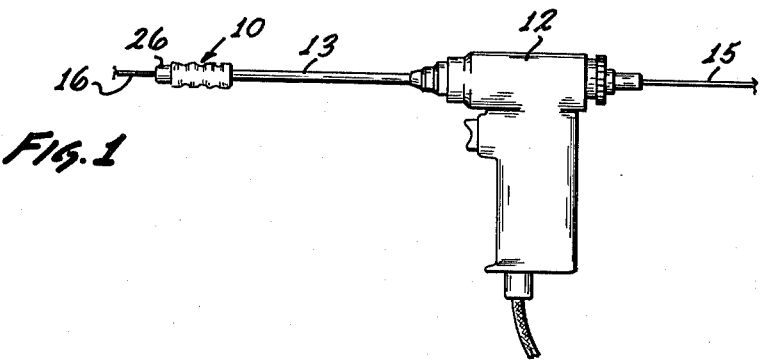
FIG. 1 is a view in perspective of an air driver and driving assembly in accordance with the present invention.

Referring to the drawings which illustrate one embodiment of a preferred form of the present invention, FIG. 1 shows the combination of the wire driver assembly 10 and an air driven tool 12, a driving connection between the wire driver assembly 10 and the power source being by the stem member 13. The stem 13 is secured to the air driver 12 in the usual manner, the stem 13 being hollow and the air driver being provided with a hollow shaft through which a wire member 15 is fed. The air driver may be of the type described in U.S. application Ser. No. 541,197, filed Jan. 15, 1975, and assigned to the same assignee.

By way of illustration of the overall operation, especially in connection with surgical procedures, actuation of the air driver 12 brings about rotation of the stem 13 and the driver assembly 10, a small portion 16 of the wire extending beyond the front face of the driver assembly being the portion of the wire 15 which is forced into the bone by pressure applied through the air driver while the latter is actuated for rotary driving motion of the wire 15. Once the forward portion 16 of the wire has been embedded into the bone, the surgeon may retract the air driver stem and driver assembly as one unit for automatically feeding another predetermined variable length of wire.

Figure 2:
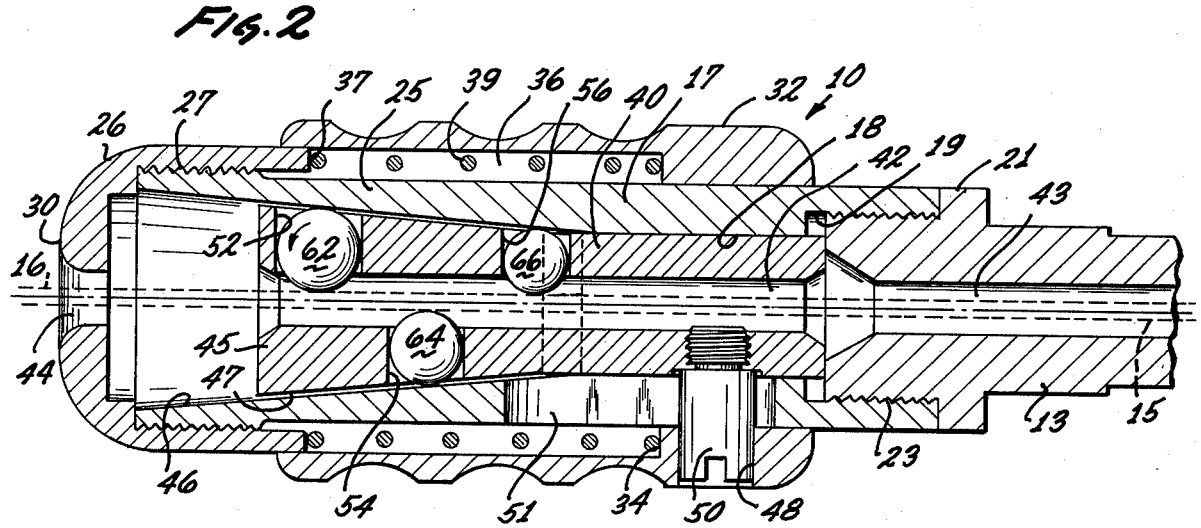
FIG. 2 is an enlarged view, partly in section and partly in elevation of one form of a surgical wire driver assembly in accordance with the present invention.

Referring to FIG. 2, the wire driver assembly 10 includes a body member 17 having a bore 18 formed therein. The rear end of the body member 17 is counter bored as indicated at 19 to receive the forward end of the stem 13, the latter being provided with a shoulder 21 which abuts against the end face of the body member, a driving connection being formed between the stem and the end of the body member by threads 23 which securely fasten the stem to the body member. The forward end 25 of the body member is tapered, as indicated, to form a bore portion which increases in diameter progressively towards the forward face of the bore.

Positioned over the forward tapered end of the body member is a cap assembly 26 secured to the forward end of the body member for rotation therewith by threads 27 such that the cap member remains affixed to the body member. The forward face of the wire driver assembly is defined by the front face 30 of the cap 26.

Positioned around the outer surface of the body member 17 is a manual release sleeve 32, the latter being provided with an internal shoulder 34 to form an annular chamber 36 between the outer surface of the body member and the inner surface of the manual release sleeve 32. The inner end 37 of the cap assembly is telescopingly mounted within the forward end of the release sleeve and in the normal position of the release sleeve the forward end thereof slightly overlaps the rearward end of the cap, as shown.

Positioned in the annular chamber 36 is a resilient member in the form of a helical spring 39 one end of which abuts the shoulder 34 and the other end of which abuts the rear face of the cap.

Received within the bore 18 of the body member is a retainer member 40, the latter being provided with a passageway 42 through which a wire member is positioned. Aligned with the passageway 42 is a passageway 43 formed in the stem 13. The cap assembly 26 is provided with a passageway 44 through which the forward end of the wire projects.

The retainer 40 includes a forward end portion 45 which is tapered, as indicated, such that its outer surface increases in diameter as one approaches the forward end of the retainer. Thus, the inner tapered surface 46 of the body corresponds generally to the outer tapered surface 47 of the retainer with a small clearance being provided therebetween as shown. In the retracted position, as shown, the forward face of the retainer is spaced from the inner wall of the cap assembly.

The release sleeve 32 is formed with a passageway 48 which receives a threaded stud 50 the latter extending through a slot 51 (FIG. 3) the end of the stud being threadably mounted to the retainer 40.

Arranged axially along the retainer 40 are three sets of apertures, 52, 54 and 56, the apertures 52 being of a diameter greater than apertures 54 which in turn are of a diameter greater than apertures 56. Received within the apertures 52, 54 and 56 are sets of spherical elements 62, 64 and 66, respectively, the diameters of the spherical elements being coordinated with the diameters of the apertures so as to permit movement of the spherical elements radially of the passageway 42.

Figure 3:
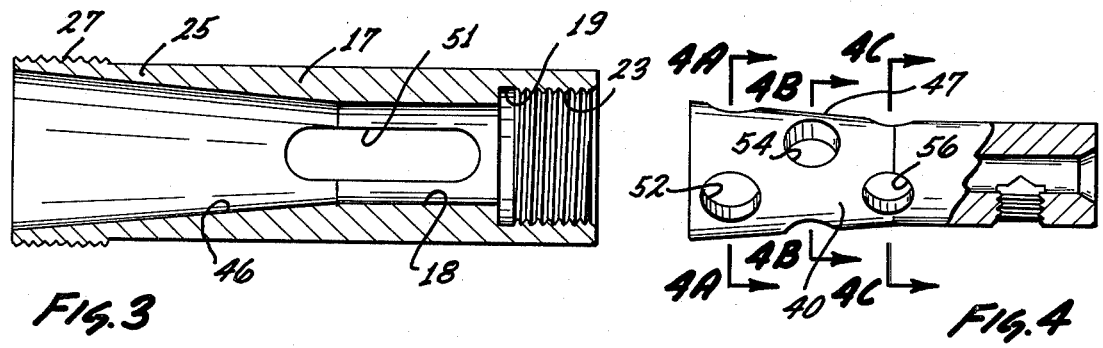
FIG. 3 is a view in section of the body member of the wire driving assembly in accordance with the present invention.

Referring to FIG. 3, the body member is illustrated in section, and the position of the slot 51 therein. By way of example, the surface 46 of the body member may be tapered 10° with the outer surface 47 of the retainer being tapered a corresponding amount.

Figure 4:
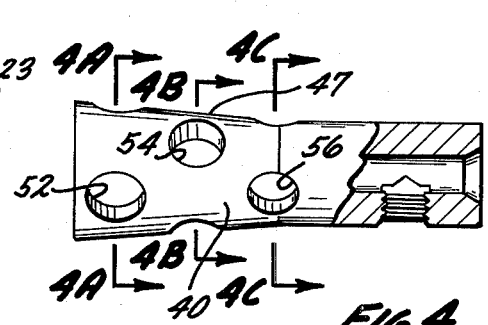
FIG. 4 is a view partly in section and partly in elevation of the retainer used in the wire driver assembly in accordance with the present invention.
Figure 4A:
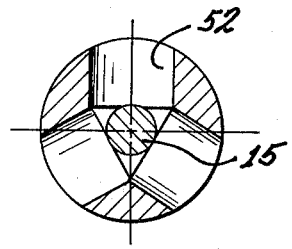
FIG. 4a is a view in section taken along the line a—a of FIG. 4.
Figure 4B:
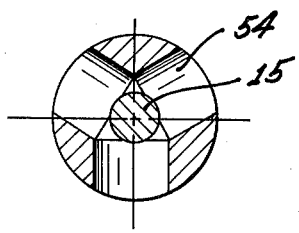
FIG. 4b is a view in section taken along the line b—b of FIG. 4.
Figure 4C:
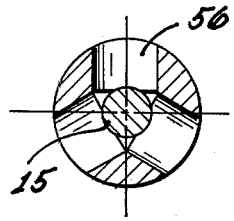
FIG. 4c is a view in section taken along the line c—c of FIG. 4.

Referring to FIG. 4, the retainer 40 is shown including the sets of apertures 52, 54 and 56. In a preferred form, three sets of apertures are used, although it is to be understood that any multiple thereof may be used such as 6, 9, etc. The apertures of each set are arranged at 120° intervals around the periphery of the retainer, with each set being in a staggered array, as shown in FIGS. 4a–4c inclusive. By way of example, the apertures 52 and 56 of the first and third set, respectively are in alignment. Also, by way of example, the apertures 52 of the first set may be of a diameter of .141 inches to receive a spherical element of approximately .140 inches, while the apertures 54 of the second set may have a diameter of .126 inches to receive spherical elements having a diameter of .125 inches. The apertures of the third set 56, may have a diameter of .111 inches to receive spherical elements having a diameter of .109 inches. Thus, the apertures in the retainer cooperating with the body member act as retaining means for the spherical elements 62, 64 and 66 respectively.

Referring to FIG. 2, the overall operation of the wire driving assembly 10 may be understood. As mentioned earlier, stem 13 is driven by an appropriate power tool of the type described resulting in rotational movement of the body member 17. The body member is pinned to the retainer 40 by means of the stud which extends through the manual release sleeve 32, the latter also being driven in rotating relationship. Assuming that a wire member is positioned within the bore 42, the sets of spherical elements 62, 64 and 66 engage the outer surface of the wire member at spaced zones axially along its length to impart rotary motion to the wire member since the retainer is driven in a rotary manner by the keyed connection made by the stud 50. As pressure is applied to the end of the wire by advancing the assembly to the left as viewed in FIG. 2, the retainer tends to move to the right of the body member thereby urging the spherical elements inwardly more tightly into driving relationship with the wire member.

In order to feed automatically an incremental length of wire, and assuming that the end of the wire is retained in some manner, all that is necessary is that the entire wire drive assembly 10 be moved to the right as viewed in FIG. 2. The retainer 40 is then able to move to the left relative to the body member 17, as viewed in FIG. 2 permitting the sets of spherical elements 62, 64 and 66 to move radially outwardly in their respective apertures 52, 54 and 56 into a wire releasing relation. As the assembly is then moved to the left as viewed in FIG. 2, or advanced, the retainer member moves to the right relative to the body member causing the spherical elements to move radially inwardly into driving engagement with the wire element.

In the event that it is necessary to release the wire manually, the surgeon merely grasps the release sleeve 32 and moves it to the left as viewed in FIG. 2 relative to the body member, against the force of the spring 36 thus moving the retainer member to the left relative to the body member. It is for this reason that the slot 51 is provided in the body member. The spring member 39 normally biases the retainer to the right, as viewed in FIG. 2 through the connection between the release sleeve, the pin 50 and the threaded connection to the retainer member, as already described.

Accordingly, it can be seen that axial movement of the retainer from a forward to a rearward position affects a driving relationship with the wire member positioned within the bore or passageway of the retainer, while movement from the right to the left affects a release of the driving relationship between the retainer and the wire member, the directions given being with reference to FIG. 2 and relative to the body member which is held stationary on the stem 13 and with respect to the prime power source. The axial movement of the retainer 40 within the bore 18 of the body member affects radial movement of the spherical elements inwardly and outwardly into driving or releasing position depending on the direction of movement.

As will be apparent, the above device is simple, effective and relatively small thus enabling it to be used advantageously in surgical procedures which require a driving rotating movement to a member. Thus, the components of the driver assembly may be made of stainless steel for simplicity of sterilization which may be by use of an autoclave. It will also be apparent that the driver assembly may be made in different sizes to accommodate different diameter wires. For example, one size of wire driver assembly may accommodate one range of wire sizes, while a second size of wire driver would accommodate a second range of sizes. Normally, the wire diameter may vary from as small as 1/32 of an inch up to a maximum of approximately 5/32 of an inch, the wire being normally stainless steel. In surgical procedures, the wire length is normally 10 inches and the usual procedure is to feed the wire through the bore of the driving tool into the stem and into the wire driver. With the wire driver of the present invention, it is possible to move the release sleeve forward and insert the wire from the front end of the wire driver assembly. Moreover, lengths of wire less than 10 inches may be inserted from the front end and become automatically gripped by the retainer mechanism.

As will be apparent, it is preferred to use three sets of spherical elements for the purpose of positive gripping and for transmitting the driving rotating torque. Since the gripping action occurs as the retainer is moved towards the rear of the wire driver, the greater the pressure exerted by the surgeon the more tightly the gripping engagement with the wire.

One of the unique advantages of the present invention is the relative small size of the assembly and the simplicity of operation, including automatic feedout of wire without the necessity of any operation other than to retract the wire driver relative to the wire and the ability to release the driving connection manually in the event that it is necessary to feed the wire back into the wire driver.

Referring to FIG. 5, another illustrative embodiment of a preferred form of the present invention is illustrated in which a wire driving assembly 60 is mounted on an air driver 12 shown fragmentarily and including the trigger, as illustrated. The wire driving instrument includes a body member 63 having a bore 64 formed therein. The bore extends the full length of the body member, and includes a tapered front end portion 65, as illustrated.

Received within the bore is a retainer member 67, the retainer member 67 including a passageway 68 therethrough. Attached to the rear end 69 of the retainer 67 is a spindle 70, the spindle including flat side portions 73 which are engaged by the rotating member 74 of the driver tool 12 to effect rotation of the spindle. As indicated, the forward end of the spindle 70 is affixed to the retainer by screw threads 76 such that rotation of the spindle brings about rotation of the retainer. The spindle 70 includes a passageway 79 which communicates with the passageway 68 formed in the retainer such that a wire member 80 may be fed through the spindle and into the retainer much in the same fashion as wire member 15, already described.

To the front end of the body member 63 there is attached a front cap assembly 83 having an aperture therein, as illustrated, for passage of the wire 80 therethrough. The front cap 83 essentially forms the front end of the wire driving instrument.

As illustrated, the forward end of the driver is provided with a chuck guard 85 fixed by set screws 86 to a chuck guard retainer 89 threaded into the open end 90 of the air tool 12.

Disposed about the outer periphery of the body member 63 is a lever assembly 95 which forms a manually operated release mechanism easily operable by the surgeon to establish the release position. As shown, the lever assembly includes a lever element 96 positioned immediately forward of the trigger, illustrated in FIG. 5, such that the surgeon may remove his forefinger from the trigger and engage the lever for actuation thereof.

The lever assembly 95 is mounted on the body member 63 to effect axial movement thereof relative to the fixed retainer 67. As illustrated, an annular space 100 is provided between the outer surface of the body member 63, the latter provided with a shoulder 101. Received on the shoulder of the body member 63 is a bearing assembly 105 which includes spaced race elements 106 and 107 and a plurality of spherical ball bearings 108 between the races. The bearing assembly is secured to the body member by an annular race retainer 109.

Affixed to the lever assembly 95 is an extension housing 110, the extension housing being affixed by a snap ring assembly 111 which fits within a groove provided in the lever assembly to engage a shoulder 113 provided on the forward end of the extension housing, as shown. The annular space 100 is defined by the interior surface of the extension housing and the spaced portion of the body member 63 and the retainer 67.

Positioned within the annular space 100 is a biasing member in the form of a spring 115, one end of the spring bearing against the forward face 117 of the spindle 70, the other end of the spring bearing against the race retainer 109 which in turn contacts the shoulder 101 of the body member 63. Thus, the spring is operative to urge the body member 63 in a forward direction, or to the left as viewed in FIG. 5.

The retainer 67 includes a slot 120 extending axially, as indicated, while the body member includes an aperture 121 into which is received a pin 122, the pin operating to establish a rotating relation between the body member 63 and the retainer which is in turn driven by the spindle. The slot 120 permits axial movement of the body member 63 relative to the retainer 67 while maintaining the driving relationship between the two.

The guard 85 is provided with a slot 125 located immediately above and to the left of the trigger, as viewed in FIG. 5, while the lever element 96 includes an extension member 128 attached thereto. In the relative position indicated in FIG. 5, the spring 115 biases the body member in the forward direction, but the length of the extension member 128 is such that it does not clear the end of the slot 125 provided in the guard 85. Accordingly, it will be apparent that as the body member 63 is rotated through the driving connection indicated, the lever assembly does not rotate since the extension 128 is positioned within the slot 125 of the guard element.

The forward end of the retainer 67 includes a plurality of sets of axially disposed apertures 130, 131, and 132, each set of apertures including three apertures disposed at a 120° relationship with respect to each other as illustrated previously in FIGS. 4a–4c. Received within each set of apertures 130–132 is a set of wire engaging elements 140, 141, and 142, respectively, the wire engaging elements being disposed along the axis of the passageway 68 formed in the retainer such that the wire engaging elements in the form of spheres contact the wire in driving relation along the length of the wire. As previously described, the tapered surface 65 of the bore cooperates with the spherical elements to urge the same radially outwardly as the body member 63 is moved to the right as viewed in FIG. 5.

In operation, the surgeon engages the lever 96 with the forefinger to retract it, that is, move it to the right as viewed in FIG. 5 which retracts the body member 63 and permitting the extension housing 110 to move over the forward end of the spindle in the space provided between the end of the spindle and the chuck guard retainer mounted on the power tool. With the body member in the retracted position, the spherical elements 140–142 are free to move radially outwardly to a wire releasing position, or in a position in which a wire can be inserted into the passageway 68 in the retainer 67. A wire member 80 may then be inserted into the wire driving instrument either through the front end 83 or from the rear end of the spindle, depending on the length of the wire and the particular mode of operation desired by the surgeon. With the wire properly positioned within the instrument, the surgeon releases the lever 96, and spring 115 is operative to move the body member 63 to the left, as viewed in FIG. 5, the tapered surface 65 of the body bore being operative to force the spherical elements 140–142 radially inwardly to engage the wire. The spring 115 is sufficiently strong to maintain driving relationship with the wire unless released by operation of the lever. Thus, in this form of the invention, rearward movement of the wire driving instrument with the front end of the wire secured in place in a patient does not allow a retraction of the wire since spring 115 is sufficiently strong to maintain the driving position until released by operation of the lever assembly 95.

During rotation of the instrument 60 illustrated in FIG. 5, the body member 63 and the retainer are driven together through the spindle while the lever assembly 95 does not rotate, by provision of the bearing assembly, the lever assembly being movable axially relative to the retainer. In the driving position, as illustrated in FIG. 5, there is considerable space between the forward end 145 of the retainer and the forward end 146 of the body member. In the release position, the space between the forward end of the retainer and the forward end of the body member 146 is significantly reduced.

It becomes apparent from the foregoing description that the release of the wire is accomplished by a rearward movement of the front end of the wire driving instrument brought about by operation of the lever 96, with the result that even though the forward end 83 of the instrument is in contact with the patient's bone or skin, release of the wire may be accomplished without forward movement of the driving instrument relative to the patient.

Referring now to FIG. 6, another exemplar of a wire driving instrument in accordance with the present invention is illustrated in the driving position in which the wire driving assembly 150 includes a body member 155 having a bore 156, the forward end 158 of which is tapered, as illustrated. Received within the bore 156 is a retainer member 160, the latter provided with a passageway 161 therein which extends the full length of the retainer, as shown.

Threaded on the rear end 162 of the retainer is a spindle 164, the spindle being provided with a passageway therein 166 communicating with the passageway 161 of the retainer 160 such that a wire may be inserted through the end of the spindle into the retainer. Received over the forward end of the body member 155 is a cap 167 which forms the forward end of the instrument. As illustrated, the forward end 168 of the retainer is spaced from the end 169 of the body member and from the cap 167.

The spindle 164 includes flats 170 for driving engagement with the tool 12, fragmentarily shown in FIG. 6 to illustrate the manner of mounting of the wire driving instrument to the tool and the general location of the trigger. Thus, rotation of the spindle by the power source effects rotation of the retainer 160 which is screwed into the end of the spindle 164 as described.

Screw threaded to the rear end of the body member and surrounding the body member is an adjustment sleeve 175 the other end of which carries a bearing assembly generally indicated 178. As shown, the end 179 of the adjustment sleeve 175 is provided with a shoulder 181 which receives a race element 182 cooperating with a spaced race element 183 between which are positioned a plurality of bearing elements 184. Race 182 is retained on the end of the adjustment sleeve by retainer ring 186 which is received within an annular groove 187, as illustrated.

Surrounding the adjustment sleeve is a lever cylinder 190, the latter including a shoulder 191 to receive the race element 183 the latter retained within the lever cylinder by a race ring assembly 192 positioned within a groove 193 provided in the end of the lever cylinder.

The forward end of the retainer includes an axially extending keyway 196 which receives a key element 197, the latter being received within a slot 198 provided in the body member. Accordingly, as the spindle 164 is rotated, the retainer is rotated along with the body member and the adjustment sleeve the end of which is supported by the bearing assembly 178.

The spindle 164 includes a transverse slot therein 200 into which is received a cross-bar member 201, the latter provided with an aperture 202 forming a passageway which communicates with the passageways of the retainer and the spindle. The cross-bar includes a boss 203 which forms a shoulder 205 against which the shoulder end of the adjustment sleeve 175 bears as shown.

Positioned within the spindle is a resilient member in the form of a helical spring 210 one end of which bears against the end of the retainer and the other end of which bears against a spring retainer 215, the latter including a central boss section 216 around which the spring is mounted. The center of the spring retainer is provided with a passageway 217 communicating with the passageway 202 in the cross-bar and the spindle and retainer. The end of the spring retainer bears against the face of the cross-bar, the latter functioning to maintain the spring in position.

Cooperating with the lever cylinder 190 is a lever 220 which is operative with the lever cylinder to form a release and driving mechanism. The lever 220 is bifurcated and pinned at two locations, through the arms 221, 222 (FIG. 6a) to the lever cylinder by pin elements 223.

In the form illustrated, the lever 220 includes a central portion spaced to the left of the trigger, as viewed in FIG. 6 so as to provide sufficient space between the lever and the trigger (dotted in FIG. 6a) for the surgeon to insert a forefinger for the purpose of contacting the trigger. The lever 220 includes a downwardly depending end handle section 227 so located relative to the handle of the air tool that the surgeon, in grasping the handle of the air tool may position the middle finger, ring finger, and pinky around the depending handle section 227 of the lever to engage the same.

Surrounding the lever cylinder and forming a part of the air tool is a guard element 230 which receives a guide pin 231 the guide pin also being received within an aperture provided within the lever. As illustrated, the lever 220 includes a boss 235, apertured to receive the pin 231. The boss bears against the front face of the guard 230 as the surgeon engages portion 227 of the lever. Thus, when the boss contacts the guard in response to movement of the lever handle, the effect is to cause the lever cylinder 190 to move axially to the left as viewed in FIG. 6 because the lever 220 is pinned thereto. Since lever cylinder is fixed axially with respect to the adjustment sleeve 175 by virtue of the bearing assembly 178, axial movement of the lever cylinder 190 also affects axial movement of the adjustment sleeve 175 and the body member to which the latter is screw threaded.

The spring 210 bears at one end against the rear of the retainer and at the other end against the spring retainer which in turn bears against the cross-bar member 201, the latter movable axially in the transverse slot which extends axially in the spindle. The cross-bar engages the adjustment sleeve 175 to urge the latter to the right, as seen in FIG. 6, causing the lever to pivot around pins 223 to the left, the dotted line position as shown in FIG. 6. Movement of the adjustment sleeve 175 to the right as seen in FIG. 6 moves the body member 155 to the right relative to the axially stationary retainer 160.

As shown and already described, the retainer includes wire engaging elements arranged as described in FIGS. 4a–4c, and operations to release or engage the wire as they move radially outwardly or radially inwardly depending upon the position of the body member relative to the retainer. Since the body member moves axially, keyway 196 extends axially to permit movement of the key 197 in an axial direction.

Adjustment sleeve 175 is threadably adjustable axially to move the body member axially in small increments. Thus, the relative position of the tapered surface 158 of the body may be varied without affecting the position of the lever assembly 220. Such an adjustment accommodates wires of various diameters. For a given wire diameter, adjustment of the sleeve varies the point at which engagement of the lever establishes driving relation with the wire.

As apparent, the spring 210 biases the unit to the release position and as long as the lever is engaged against the power tool, a driving relation is established, assuming proper adjustment of the sleeve 175 for the wire diameter being used. Release of the lever automatically provides wire release. Thus, the surgeon has positive manual control of release, driving and rotation with one hand. It is also important that release is effected by rearward movement of the body relative to the retainer and relative to the wire. Thus, the surgeon may place the front end 167 of the instrument firmly against the patient in a driving sequence and effect release by releasing the lever handle which causes rearward movement, or to the right as seen in FIG. 6.

We claim:
1. A surgical wire driving assembly for driving a wire in a rotary direction and providing for operator controlled incremental axial movement of said wire comprising:
   body means having a bore, the forward end of which is tapered,
   retainer means having a complementary taper positioned in said bore and having a passageway therethrough to receive a wire element to be driven,
   one of said body and retainer means being movable axially relative to the other,
   means to effect rotation of said body and said retainer means,
   said retainer means including at least three sets of spaced spherical wire engaging elements positioned along and circumferentially about the axis of the passageway and movable radially thereof and being operative in a first position of said retainer means relative to said body means to establish a wobble-free driving relation with respect to a wire located in said passageway and operative in a second position of said retainer means relative to said body means to establish a release position with respect to a wire located in said passageway,
   means to bias one of said body and retainer means into one of said first or second positions, and
   manually movable means having a surface engageable by an operator's hand to effect movement of one of said body and retainer means to the other of said first or second positions.

2. A surgical wire driving assembly as set forth in claim 1 wherein
said movable means is operative to move said retainer means relative to said body means.

3. A surgical wire driving assembly as set forth in claim 1 wherein
said movable means is operative to move said body member relative to said retainer means.

4. A surgical wire driving assembly as set forth in claim 1 wherein
said bore is tapered such that the forward end is of greater diameter than the remaining portion of said bore.

5. A surgical wire driving assembly as set forth in claim 4 wherein
said wire engaging elements are spaced along the axis of said passageway and wherein said tapered portion of the bore is operative to urge said wire engaging elements into wire engaging relation in one relative position in said bore and in wire releasing relation in another relative position in said bore.

6. A surgical tool as set forth in claim 1 wherein
said spherical elements include a plurality of sets of spherical elements, the set of elements at the end of said retainer adjacent the forward end of the bore each having a diameter greater than the remaining set, and
the diameter of the elements of the remaining sets becoming progressively smaller as said sets are spaced axially away from the forward end of said bore.

7. A surgical wire driving assembly as set forth in claim 1 wherein
said movable means is rotated with said body means, and
wherein said means for rotating said retainer means and said body means permits axial movement of said retainer means relative to said body means.

8. A surgical wire driving assembly as set forth in claim 1 wherein
said movable means is stationary relative to said body means, and
wherein said means for rotating said retainer means and said body means permits axial movement of said body means relative to said retainer means.

9. A surgical instrument for holding a wire member in a fixed position to effect rotation thereof and for implanting a wire member into a patient's bone structure and providing for operator controlled incremental axial movement of said wire comprising:
a wire driving assembly including means to mount said assembly on a power source to effect rotation of said assembly such that rotary motion is imparted to a wire member to be implanted in a bone, the wire normally extending beyond the front face of said assembly,
said assembly including means so engaging a wire member that as said assembly is urged towards a patient's bone and the wire is engaged by the bone, the engaging means effects rotation of the wire member while maintaining the wire fixed axially with respect to said assembly,
said engaging means including a body means having a bore, the forward end of which is tapered,
retainer means having a complementary taper positioned in said body means and having a passageway therethrough to receive said wire,
said retainer means including at least three sets of spaced spherical wire engaging elements positioned along and circumferentially about the axis of the passageway and movable radially thereof and being operative in a first position of said retainer means relative to said body means to establish a wobble-free driving relation with respect to a wire located in said passageway and operative in a second position of said retainer means relative to said body means to establish a release position with respect to a wire located in said passageway, the front face of said retainer means being spaced axially from the front face of the body means in the wire engaging position,
means normally biasing one of said body and retainer means to one of said first or second positions, and
manually movable means having a surface engageable by an operator's hand to effect movement of one of said body and retainer means to the other of said first or second positions.

10. A surgical instrument as set forth in claim 9 wherein
said retainer means is movable.

11. A surgical instrument as set forth in claim 9 wherein
said body means is movable.

12. A surgical instrument as set forth in claim 9 wherein
said biasing means is a spring spaced radially outwardly of said retainer means.

13. A surgical instrument as set forth in claim 10 wherein
said retainer means is movable towards the forward end of said body means to a release position.

14. A surgical instrument as set forth in claim 11 wherein
said body means is movable towards the front face of said retainer means.

15. A surgical instrument as set forth in claim 9 wherein
said wire engaging elements are spheres,
said retaining means includes three sets of apertures spaced axially along the retainer means, and
the diameter of each set of wire engaging spheres decreases from the forward end of said retainer means towards the rear thereof.

16. A surgical instrument as set forth in claim 9 wherein
said means to effect relative movement is movable away from the forward end of said body means to effect said movement.

17. A surgical instrument as set forth in claim 9 wherein
said means to effect relative movement is movable towards the forward end of said body means to effect said movement.

18. A surgical instrument as set forth in claim 9 wherein
said biasing means normally biases the movable member to the wire release position,
said movable means to effect relative movement including means engageable by the surgeon to establish said driving relation, and
means to effect adjustable movement of body means relative to said retainer.

19. A surgical instrument as set forth in claim 18 wherein
said body means is movable forward relative to said retainer means to establish a driving relation, and
said retainer means including a plurality of axially spaced elements to engage a wire at axially spaced locations.

* * * * *

UNITED STATES PATENT AND TRADEMARK OFFICE
CERTIFICATE OF CORRECTION

PATENT NO. : 3,975,032
DATED : August 17, 1976
INVENTOR(S) : John H. Bent and Anthony Russo It is certified that error appears in the above-identified patent and that said Letters Patent are hereby corrected as shown below:

Column 2, line 68 (last line), "with" should be changed to -- which --;

Column 14, line 39, after "in FIG. 6" insert the following paragraphs:

-- As with the other forms, wire may be inserted from the front, or the rear ends of the spindle. The lever provides a natural driving feel since the surgeon's grip in driving tends to tighten, thereby securely holding the lever handle in the driving position. Even in retracting a wire, the feel is natural because the grip of the power tool handle is firmer and it is relatively easy to grip the lever handle firmly.

Various types of prime power sources may be used, although it is preferred to use an air driven gun of the type previously described.

Although an exemplary embodiment of the invention has been shown and described, many changes, modifications and substitutions may be made by one having ordinary skill in the art without necessarily departing from the spirit and scope of this invention. --

Signed and Sealed this

Fourteenth Day of December 1976

[SEAL]

Attest:

RUTH C. MASON
*Attesting Officer*

C. MARSHALL DANN
*Commissioner of Patents and Trademarks*